June 20, 1933.  C. L. BLACKBURN  1,915,178
LIQUID LEVEL INDICATING ARRANGEMENTS
Filed Sept. 7, 1932  4 Sheets-Sheet 1
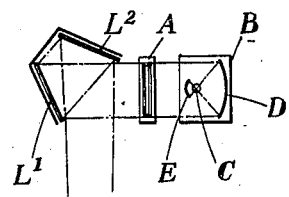
Fig. 1.
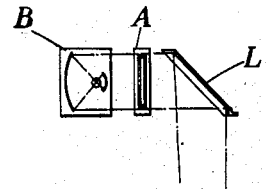
Fig. 2.
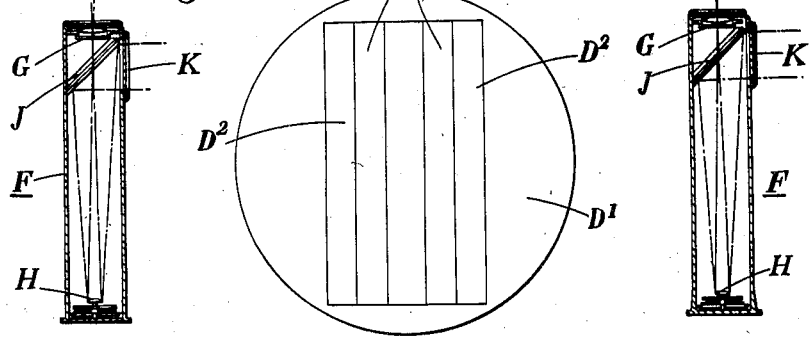
Fig. 6.
Fig. 7.
Fig. 22.
Fig. 21.
Fig. 23.
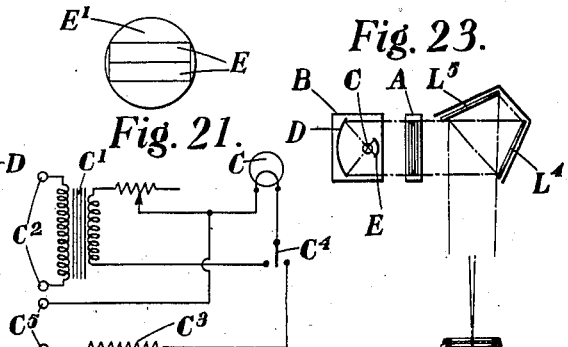
Fig. 24.
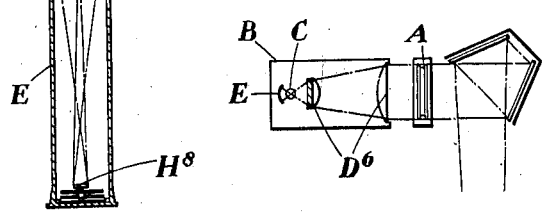
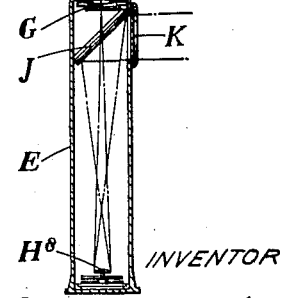
INVENTOR
C. L. BLACKBURN.
BY
Blair & Kilcoyne
ATTORNEY June 20, 1933.   C. L. BLACKBURN   1,915,178
LIQUID LEVEL INDICATING ARRANGEMENTS
Filed Sept. 7, 1932   4 Sheets-Sheet 2
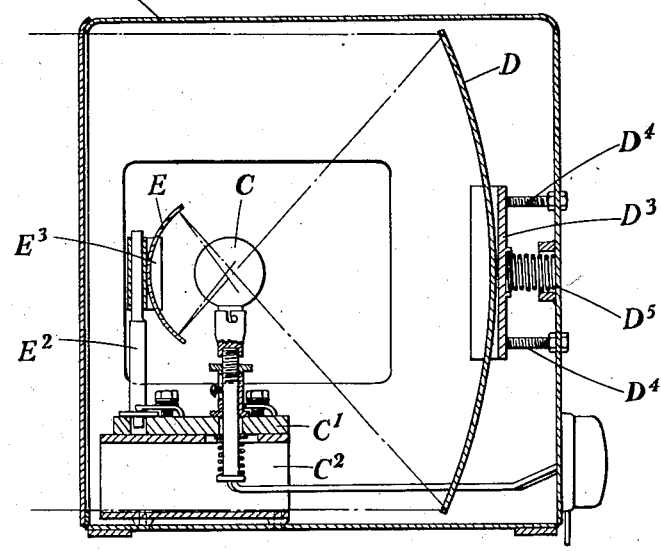
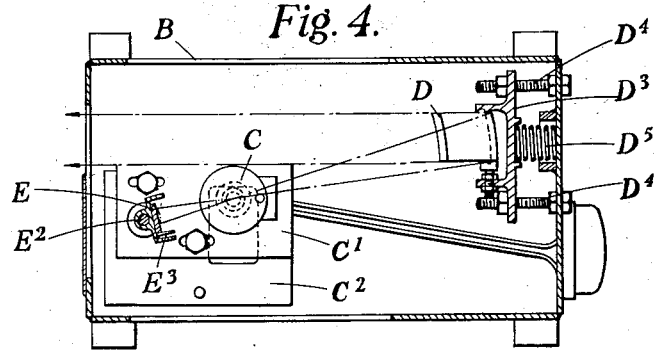
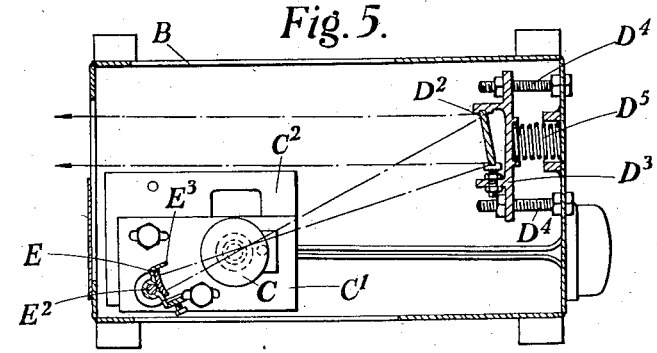
INVENTOR
C. L. BLACKBURN.
BY
ATTORNEY

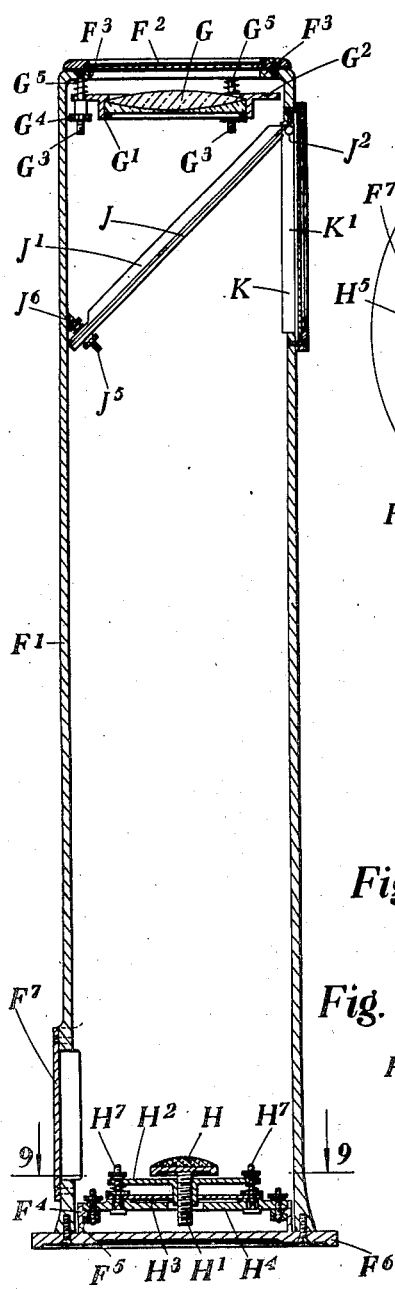
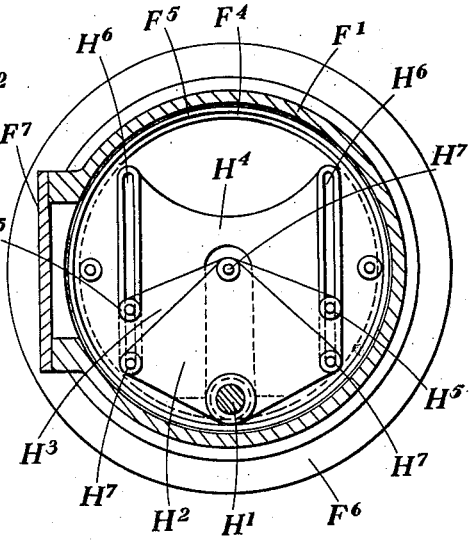
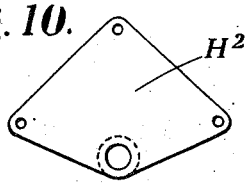
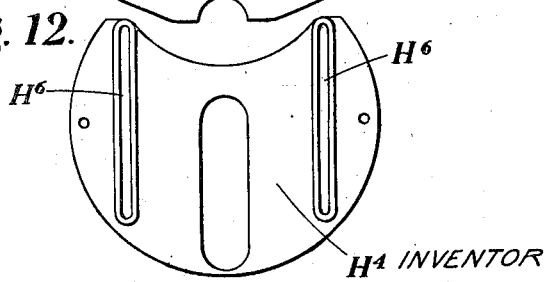

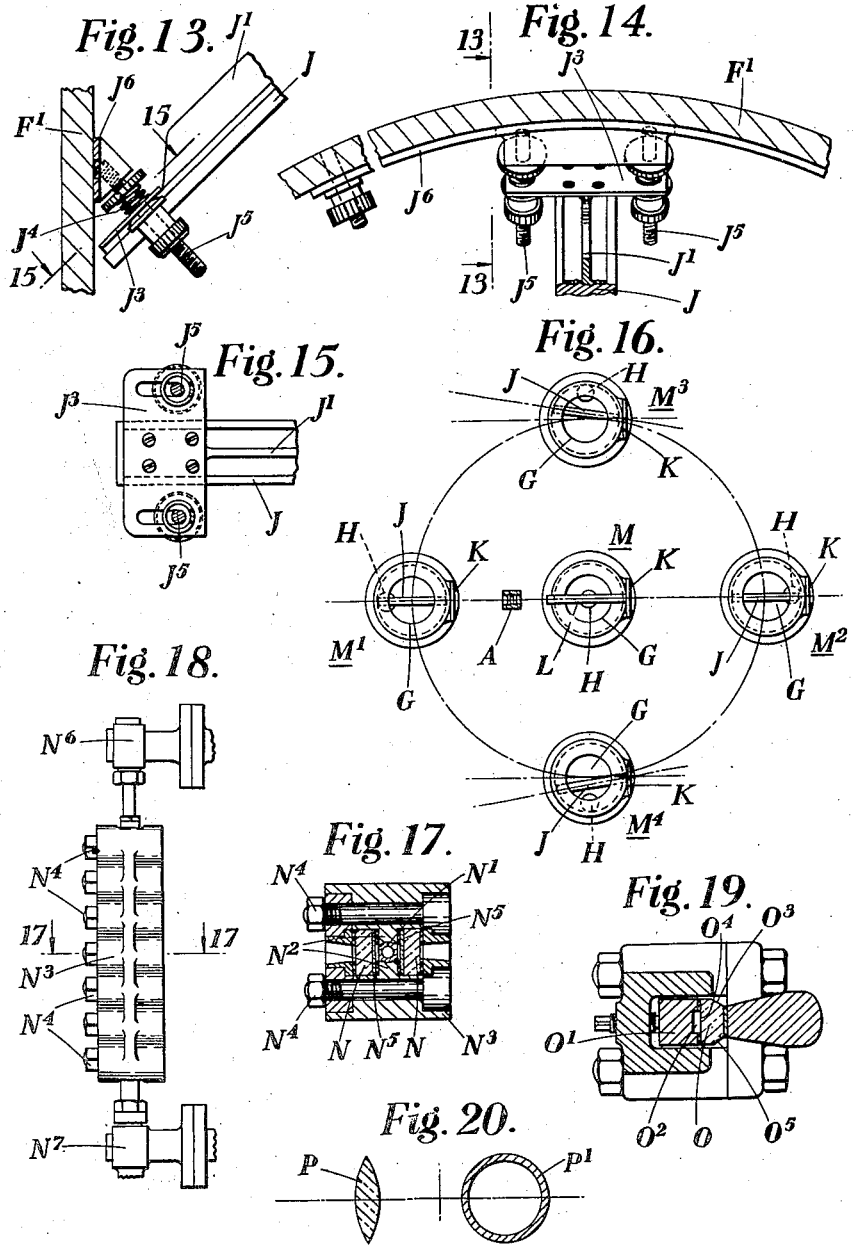

Patented June 20, 1933

1,915,178

UNITED STATES PATENT OFFICE

CHARLES LORD BLACKBURN, OF WESTMINSTER, LONDON, ENGLAND, ASSIGNOR TO ELECTRICAL IMPROVEMENTS LIMITED, OF NEWCASTLE-ON-TYNE, ENGLAND, A COMPANY OF GREAT BRITAIN

LIQUID LEVEL INDICATING ARRANGEMENTS

Application filed September 7, 1932, Serial No. 632,027, and in Great Britain September 23, 1931.

This invention relates to liquid level indicating arrangements. In very large boilers or steam generators with high combustion chambers the water level gauge is necessarily mounted at a considerable height above the firing floor, and considerable difficulty has been experienced in rendering the gauge readily visible from the firing floor. Although applicable to other purposes, the invention is more especially intended for the reproduction of the indications of a boiler water level gauge at or about eye level on the firing floor.

The primary object of the invention is to provide a satisfactory optical arrangement whereby a real image of the gauge can be projected on to a diffusing screen located in a convenient position remote from the gauge.

A further object is to incorporate the principal elements of the optical projecting system and the diffusing screen in a single unit of convenient practical construction.

Another object is to povide an effective and economical arrangement of the optical elements associated with the source of light for illuminating the gauge, this arrangement being primarily intended for use with a system for projecting an image of the gauge to a distance, but applicable also to the illumination of a gauge to be observed by direct vision or by simple reflection in one or more plane mirrors.

Other objects are concerned with practical constructions of liquid level gauge more especially suitable for use in an optical projecting arrangement.

Still further objects of the invention will be apparent from the appended claims and from the description of the accompanying drawings, in which the invention is illustrated as applied to the reproduction at eye level on the firing floor of the indications of the water level gauge of a steam boiler having a high combustion chamber, wherein the gauge is mounted at a height of thirty feet or more above the firing floor. In these drawings, Figure 1 is a somewhat diagrammatic side elevation of the preferred arrangement.

Figure 2 is a view generally similar to Figure 1 showing a modified form of the preferred arrangement, Figures 3 and 4 are views illustrating on an enlarged scale the optical condensing system employed in the arrangements of Figures 1 and 2, Figure 5 is a view similar to Figure 4 showing a modified arrangement, Figures 6 and 7 are diagrams illustrating the manner in which the mirrors utilized in the optical condensing system of Figures 3-5 are cut.

Figure 8 is a vertical section through the parts of the apparatus of Figures 1 and 2 located on the firing floor, Figure 9 is a horizontal section on the line 9—9 of Figure 8, Figures 10–12 are detail views of parts of the apparatus shown in Figures 8 and 9, Figures 13–15 are sectional views showing the mounting of a mirror employed in the apparatus of Figures 8 and 9, Figure 13 being a section on the line 13—13 of Figure 14 and Figure 15 a section on the line 15—15 of Figure 13, Figure 16 is a diagrammatic plan view illustrating various adjustments of the apparatus of Figures 8 and 9, Figures 17–20 illustrate some alternative constructions of liquid level gauge which may be employed in the arrangements of Figures 1 and 2, Figure 21 is a diagram of a suitable circuit arrangement for the electric lamp for illuminating the gauge, Figures 22 and 23 are views similar to Figures 1 and 2 illustrating a modified arrangement of the apparatus on the firing floor, and Figure 24 illustrates a modified arrangement of the optical condensing system.

As indicated in Figures 1 and 2, the preferred arrangement comprises broadly in addition to the gauge A itself, an illuminating unit B mounted near the gauge A and including the source of light C, a paraboloidal condensing mirror D and a spherical reflector E; a projection unit F mounted on the firing floor and including a convex projecting lens G, a convex mirror H, an inclined plane mirror J and a diffusing screen K; and one or more plane mirrors for deflecting the horizontal emergent beam from the gauge A downwards to the projection unit F.

As the source of light in the illuminating unit B an electric lamp C (see Figures 3 and 4) is employed which gives a small but intense source of light. For this purpose (see Figure 21) it is preferable to employ a low voltage lamp C normally supplied through a step-down transformer $C^1$ from a. c. lighting mains $C^2$, a substitution limiting resistance $C^3$ being provided, so that, in the event of failure of the a. c. supply, the lamp may be switched over by a control switch $C^4$ so that it is fed through the limiting resistance $C^3$ from an auxiliary d. c. supply $C^5$. Means may be provided, if desired, for reducing the voltage applied to the lamp at night-time when less illumination will usually be required, and a spare lamp may be provided which is mounted with the main lamp on a swinging frame to ensure rapid change-over if the main lamp fails.

The condensing mirror D preferably consists of a narrow vertical strip cut from a paraboloid of revolution having a horizontal axis, the strip lying to one side of the axis. Figure 6 indicates the complete paraboloidal mirror $D^1$ from which two strips like the strip D of Figures 3 and 4 can be cut, these strips lying one on either side of the axis. It will be appreciated that a number of such strips can be cut from a single paraboloidal mirror blank $D^1$, Figure 6 showing an arrangement in which four strips are obtained, two corresponding to the strip D of Figures 3 and 4 and two $D^2$ at a greater distance from the axis. Figure 5 shows the manner in which the condensing system is modified when a strip such as $D^2$ is used, the strip being offset from the optical axis of the condensing system by a distance corresponding to its distance from the axis of the mirror blank from which it was cut. Alternatively the condensing mirror strip may be similarly cut from a mirror having spherical faces, the radius of curvature of the front face being made less than that of the back face so that the spherical aberration of the mirror is to a large extent compensated by that of the concave meniscus lens formed by the glass. The lamp C is disposed with its filament lying on the axis of the paraboloidal or spherical mirror D or $D^2$ and is slightly displaced from the focus thereof, so that the light failing on the strip is reflected in the form of an approximately parallel (or rather slightly convergent) beam which passes to one side of the lamp and illuminates the whole length of the gauge A brightly and evenly without interference from the shadow of the lamp.

The reflector E similarly consists of a narrow vertical strip cut from a concave spherical mirror $E^1$ as shown in Figure 7, and is located so that the lamp filament is approximately at its centre of curvature whereby a full-size image of the filament is thrown back on the filament itself (or preferably very slightly to one side of the filament) the light from this double source being reflected on to the gauge A by the condensing mirror D.

The whole illuminating unit B is mounted in a suitable box, which is adjustable in position to ensure that the emergent beam is properly directed on to the gauge A. The condensing mirror strip D or $D^2$ is carried by a frame $D^3$ adjustably mounted in the box B by means of three adjusting screws $D^4$ and a spring $D^5$. The lamp C is carried at an adjustable height by a plate $C^1$ capable of sliding over a table $C^2$ into one or other of the two positions shown in Figures 4 and 5. The plate $C^1$ also carries a pillar $E^2$ on which is mounted a bracket $E^3$ carrying the reflector E. The various elements in the illuminating unit are so adjusted that a sharp image of the lamp filament is accurately focussed on the projecting lens G.

The horizontal emergent beam from the gauge A is deflected downwards to the projection unit F by means of one or a pair of plane mirrors, the arrangement in each case being such that an erect image of the gauge is obtained on the diffusing screen K. Since the image is inverted by the projecting lens G and is also twice reflected in the projection unit F, a single plane mirror L (Figure 2) inclined at an angle of 45° to the vertical will serve to give an erect image on the screen K in cases where the plane mirror is disposed in front of the gauge A and the screen is viewed from the front. A pair of plane mirrors $L^1 L^2$ (Figure 1) inclined to one another at 45° will however be required in cases where the mirrors are located behind the gauge A and the screen K is viewed from the front. The plane mirror L or mirrors $L^1 L^2$ in each case consist of narrow strips and are made adjustable so that the beam may be directed downwards at a slight angle to the vertical in cases where it is inconvenient to locate the mirror or mirrors vertically above the projection unit F. To avoid troubles from double reflection the mirror L or mirrors $L^1 L^2$ may be silvered on the front surface or alternatively may be made wedge-shaped with the usual back-surface silvering so that the undesired reflection from the front surface is deflected away from the projection unit F.

The projection unit F (see Figures 8–13) comprises a cylindrical metal casing $F^1$ resting vertically on the firing floor and closed at its upper end by a plate glass window $F^2$, the casing being made as dust-tight as possible. Immediately beneath the plate glass window $F^2$ is mounted the convex projecting lens G, which is in the form of an achromatic objective designed for low spherical aberration and is of such focal length as to produce a reduced real image of the gauge A at a point just below the lower end of the casing F¹. Mounted near the bottom of the casing F¹ is a convex mirror H of such focal length that the reduced image produced by the projecting lens G lies between the mirror H and its focus and an enlarged image thereof is formed on the ground glass diffusing screen K after reflection in the inclined plane mirror J, the diffusing screen K being mounted in a lateral opening in the casing F¹ near the top thereof with the inclined plane mirror J just behind it. In order to obtain an image on the screen K of the same size as the gauge A itself, it is desirable to arrange that the convex mirror H is located at the principal focus of the projecting lens G and that the distance from the convex mirror to the diffusing screen K after reflection at the plane mirror J is equal to the focal length of the projecting lens G.

The inclined plane mirror J behind the diffusing screen K is in the form of a narrow strip just wide enough to reflect the whole width of the beam of light without obstructing the rays passing from the projecting lens G to the convex mirror H more than the minimum extent. The image on the diffusing screen K is generally in the form of a narrow vertical strip, and the nearer the inclined mirror J is to the screen, the narrower the mirror may be. Moreover the nearer the inclined mirror is to the projecting lens G, the less the obstruction of the convergent beam falling on the convex mirror H. Consequently the centre of the screen K is placed at about eye level on the firing floor and the plane mirror J is disposed close behind it. The focal length of the projecting lens G is thus determined by the distance from the diffusing screen K via the plane mirror J to the convex mirror H at the bottom of the casing F¹ and the projecting lens G is located so that its exit principal point is the same distance from the inclined mirror J as is the centre of the screen K. This ensures that the focus of the projecting lens will be at the convex mirror H and, provided that the mirror H is of the correct focal length to give a sharp image of the gauge A on the screen K, the condition that the image should be full-size is fulfilled. In practice, it is desirable to mount the convex mirror H so that it can be adjusted vertically and to make the mirror of focal length slightly greater than that required for a full-size image, so that the mirror can be raised slightly to secure a sharply focussed image of slightly reduced size.

Usually the upper mirror L or pair of mirrors L¹ L² will be located vertically above the projection unit, in which case the plane mirror J behind the diffusing screen K will be symmetrically placed at an angle of 45° to the vertical. When however it is inconvenient to dispose the upper mirror L or mirrors L¹ L² in this position, they are tilted to project the beam of light at an angle to the vertical on to the projecting lens G. This necessitates adjustment of the optical elements in the projection unit F, and a convenient mounting for each of these elements to permit such adjustment will now be described.

The projecting lens G is secured in position within a cylindrical flange G¹ on a metal ring G² supported on three threaded bolts G³ extending downwardly from an inwardly projecting lip F³ on the top of the casing F which carries the plate glass window F². The metal ring G² is carried by nuts G⁴ on these bolts G³ and springs G⁵ are provided around the bolts to press the ring tightly against the nuts. Thus by adjusting the nuts G⁴ the projecting lens G can be tilted so that its axis passes through the centre of the upper mirror L.

The convex mirror H is so mounted that it can be displaced in any direction horizontally within the limits of the casing F¹ and can also be tilted to make it coaxial with the projecting lens G. In one convenient arrangement the convex mirror H is secured in a suitable frame from the back of which a threaded bolt H¹ projects. This bolt engages in a tapped hole in a plate H² carried by a bridge piece H³, which can slide across a horizontal disc H⁴ and can be clamped thereto by bolts H⁵ engaging in slots H⁶ in the disc, the plate H² being connected to the bridge piece H³ by means of three bolts H⁷ carrying nuts and springs in a manner similar to that employed for the projecting lens mounting. The plate H² can thus be tilted so that the axis of the convex mirror H always passes through the centre of the projecting lens G whatever the position of the bridge piece H³ on the disc H⁴. The horizontal disc H⁴ is also so mounted that it can be clamped in any desired angular position on the flange F⁴ on a cylindrical rib F⁵ projecting upwardly from the base plate F⁶ of the casing F¹. It will be clear that this mounting enables the convex mirror H to be adjusted in position and simultaneously tilted to suit the tilting of the projecting lens G.

The inclined plane mirror J (see Figure 8 and Figures 13–15) is carried by a T-shaped metal bar J¹ universally pivoted at J² at its upper end to the casing F¹ at the top of the window K¹ in which the diffusing screen K is mounted. At its lower end the T-bar J¹ carries a bracket J³ which is pressed by springs J⁴ against nuts on two bolts J⁵ extending at an angle of 45° to the vertical from a slotted circumferential plate J⁶ which can be secured by nuts and bolts in the desired angular position to the casing F¹. Thus the lower end of the mirror J can be swung round and the mirror can also be tilted by tightening or loosening one of the nuts J⁵ supporting the bracket J³ to suit the position into which the convex mirror H has been adjusted, the adjustments being such that an erect image in the centre of the diffusing screen K is obtained.

To avoid the production of double images the plane mirror J and the convex mirror H may be made of polished metal (such as stainless steel) or may be made of glass silvered on the front surface. Alternatively the convex mirror H may be made of glass with the usual back-surface silvering but with the front and back surfaces of different curvature so that the faint image formed by reflection at the front surface will be out of focus on the diffusing screen K.

The diffusing screen K is detachably mounted in the window $K^1$, which is made large enough to permit access to or removal of the plane mirror J and the projecting lens G for adjustment or cleaning purposes, and a door $F^7$ of suitable size is provided at the lower end of the casing $F^1$ for a similar purpose with respect to the convex mirror H.

Figure 16 is a diagrammatic plan view indicating the nature of the adjustments to be made in the parts of the projection unit F for various positions of this unit relative to the position of the upper plane mirror L or mirrors $L^1 L^2$. In Figure 16 it is assumed that the arrangement of Figure 2 with a single upper plane mirror L is used. When the projection unit F is vertically below the mirror L, as indicated at M in Figure 16, the parts of the unit are adjusted in the manner shown in Figures 8–16 with the convex mirror H central and the plane mirror J vertically below the upper plane mirror L. When the unit is in either of the positions $M^1 M^2$, the common axis of the projecting lens G and the convex mirror H lie in the same vertical plane as the upper mirror L. The lower mirror J also lies in this plane but is inclined at the appropriate angle (either greater than or less than 45° as the case may be) to the vertical, in order that the beam of light through the diffusing screen K shall be horizontal, the convex mirror H being moved to one end of the diameter of the disc $H^4$ (Figures 8–12) without rotating this disc. For the positions $M^3$ and $M^4$, the convex mirror H is moved to the end of the diameter and the disc $H^4$ is rotated through a right angle, the common axis of the mirror H and the lens G passing through the upper plane mirror L. The lower plane mirror J is in these positions swung round and tilted to an extent sufficient to throw an erect image of the gauge A on the diffusing screen K. It will be clear from Figure 16 how the various adjustments should be made for other positions of the projecting unit within the circle containing the four positions $M^1 M^2 M^3 M^4$, in order to ensure obtaining an erect image of the gauge properly projected on to the diffusing screen.

In some cases it may be desirable to mount the projection unit F at a height from the firing floor in order to clear obstructions to the view. The mounting of the inclined plane mirror J above described enables the necessary adjustment for this purpose to be made, the diffusing screen K also being so mounted that it can be tilted forward sufficiently to be perpendicular to the beam of light thereby giving an undistorted image.

It will be appreciated that plane mirrors may be interposed in the path of the rays at various points, if for any reason it is desired to deflect the path. Thus for instance in order to locate the illuminating unit B in a convenient position in some installations it may be desirable to interpose one or more vertical plane mirrors between this unit and the gauge A, and for a similar purpose one or more vertical plane mirrors may be interposed between the gauge A and the upper plane mirror L or mirrors $L^1 L^2$. Again a vertical plane mirror may be located in front of or behind the diffusing screen K in order to suit a required direction of observation. Such plane mirrors as also the other plane mirrors utilized in the whole system may in many instances be replaced by totally reflecting prisms. In order to provide a ready means of adjustment to enable the direction of observation to be changed, the diffusing screen may be in the form of a vertical cylinder, the rays from the inclined plane mirror J being reflected in a vertical plane mirror mounted rotatably about the axis of such cylinder before being thrown on to the diffusing screen.

The optical projecting system in the projection unit F comprising the convex projecting lens G and the convex mirror H may be replaced, if desired, by an equivalent optical system. Thus for instance, as shown in Figures 22 and 23, the convex mirror H may be replaced by a concave mirror $H^8$ mounted in generally the same manner as that described above for the mirror H. Since this change results in a further inversion of the image, the pair of upper mirrors $L^1 L^2$ of Figure 1 are replaced by a single mirror $L^3$ as shown in Figure 22, and the single upper mirror L of Figure 2 is replaced by a pair of mirrors $L^4 L^5$ as shown in Figure 23. The mirror H may also be replaced, if desired, by a suitably arranged concave lens which focuses an enlarged image on the diffusing screen, whilst the convex projecting lens G may be replaced by a concave mirror so mounted as to produce a reduced image of the gauge at a suitable point. In yet another alternative the convex mirror H may be replaced by a combination of two inclined plane mirrors approximately at right angles to one another with a concave lens having a horizontal axis interposed between them, so that the rays from the projecting lens are reflected in each of these mirrors before passing to the inclined plane mirror strip behind the diffusing screen. This alternative has the advantage that by rotating the system about a vertical axis, an erect image can be obtained with the diffusing screen pointing in any desired direction.

Similarly, as indicated in Figure 24, the concave mirror D constituting the optical condensing system may be replaced by a condensing lens or lens system $D^6$ or by a suitable combination of lenses and mirrors.

In the above description the gauge A itself has been referred to in general terms as of the transparent prism type. It will be realized that the arrangement is more especially suitable for use with a gauge of this type or more generally of any type in which all the operative gauge surfaces lie in vertical planes. Thus for instance, as indicated in horizontal section in Figure 17 and in side elevation in Figure 18, the gauge may be of the well-known type in which the water and steam column $N^1$ is enclosed between two parallel glass plates N, which are forced into tight engagement with central projections $N^2$ on a casing $N^3$ by means of bolts $N^4$. Thin sheets of mica $N^5$ are disposed in front of the surfaces of the glass plates N in order to protect these surfaces against corrosion. The water and steam column $N^1$ is suitably packed and is connected at its upper and lower ends by valve-controlled pipes $N^6$ $N^7$ respectively to the steam and water spaces in the boiler. In this arrangement a clear indication of the water level is obtained on the diffusing screen K by the dark shadow formed by the meniscus.

Figure 19 is a horizontal section through another known form of water gauge. In this instance the gauge is of the reflecting type and comprises a glass prism O mounted vertically in front of a channel-shaped metal bar $O^1$, so as to leave behind the reflecting surface of the prism O a narrow space $O^2$ in open communication through pipes at the top and bottom with the steam space and the water space of the boiler. Thus light entering the prism O through one of its inclined faces $O^3$ and incident on the upper portion of the back reflecting surface $O^4$ of the prism, where such surface is in contact with the steam, will be totally reflected out again through the other inclined face $O^5$ of the prism, whilst light incident on the lower portion of the surface $O^4$ in contact with the water will be refracted into the water, only a very small percentage of the light being directly reflected. The prism O will thus appear brightly lighted in the upper portion but dark in the lower portion, and the dividing line between the light and dark portions indicates the water level in the boiler.

Other plane-surface gauges, wherein the indication of the water level is obtained owing to the difference between the refractive indices of the water and of the steam in contact with the gauge surfaces, may also be employed.

The invention is also applicable when a gauge having curved surfaces, such for example as the well-known form of tubular gauge, is employed, but in such cases it is necessary to provide an astigmatic optical system in association with the gauge in order to compensate for the lens effect of the cylindrical water column, the compensation being such that parallel rays of light incident on the combined gauge and astigmatic system below the water level should emerge as parallel rays of light. The compensating astigmatic system may take the form (as diagrammatically shown in horizontal section in Figure 20) of a cylindrical lens P of suitable focal length or its equivalent either in front of or behind the gauge $P^1$.

In some instances it is more convenient to employ two gauges side by side but at different levels, in order to obtain the effect of a single long gauge without the practical difficulties involved in the construction of a long gauge for installations in which very heavy pressures obtain. When the invention is applied to such an arrangement, it is preferable so to arrange the optical systems that the images of the two gauges are reproduced on the same diffusing screen one beneath the other to form a single continuous image. This desired superimposition of the two sets of rays can be effected by a suitable arrangement of the inclined plane mirrors employed for deflecting the horizontal emergent rays from the gauges down to the projection unit. Thus when the two gauges are illuminated by approximately parallel beams of light, derived for example from two independent illuminating units of the kind above described or from a single condensing mirror strip wide enough to cover both gauges with a single source near its focus, the emergent beam from the upper gauge may be deflected downwardly, say, by a single mirror arranged in the manner above described, whilst that from the lower gauge may be reflected in a pair of mirrors at right angles to one another with their line of intersection at 45° to the horizontal. Thus the rays incident on the first mirror are reflected sideways and downwards so that they impinge on the second mirror and are reflected vertically downwards approximately in the same vertical plane as the rays emergent from the upper gauge.

It will be appreciated that the above-described arrangement may be modified in various ways within the scope of the invention. Thus for example the paths of the rays from the illuminating unit to the projection unit may be wholly enclosed in a tubular structure designed to exclude stray light and dust. Again although described with reference to water level indication in a boiler installation wherein the gauge is mounted at a height above the firing floor, the invention is also applicable with suitable modifications to other purposes and may generally be applied to liquid level indicating purposes where it is desired to obtain an indication at a distance from the point at which the gauge is installed. The optical condensing system may also be employed with a liquid level gauge in cases where the gauge is viewed directly or through a plane mirror or mirrors without focussing on to a diffusing screen, and in such cases it is often convenient to employ as the source of light an electric lamp having an opal or other diffusing glass envelope, so that the gauge can be viewed over a somewhat wider angle of vision.

What I claim as my invention and desire to secure by Letters Patent is:—

1. In a liquid level indicating arrangement, the combination of a liquid level gauge, a source of light for illuminating the gauge, a tubular casing remote from the gauge, a diffusing screen mounted in the wall of such casing towards one end thereof, an inclined mirror within the casing adjacent to the diffusing screen, means for deflecting the emergent beam of light from the gauge towards the end of the casing adjacent to the diffusing screen, and an optical projecting system within the casing for focusing a real image of the gauge on the diffusing screen, such system including means whereby the rays of light entering the casing at the end adjacent to the diffusing screen are reflected at the remote end of the casing and are again reflected by the inclined mirror on to the diffusing screen.

2. In a liquid level indicating arrangement, the combination of a liquid level gauge, a source of light for illuminating the gauge, a tubular casing remote from the gauge, means for deflecting the emergent beam of light from the gauge so that it enters the tubular casing at one end, a diffusing screen in the wall of the casing towards the end at which the light enters the casing, an inclined plane mirror within the casing adjacent to the diffusing screen, and an optical projecting system within the casing comprising a lens mounted at the end of the casing at which the light enters and a curved mirror at the remote end of the casing, the focal lengths of the lens and mirror being such that the lens focuses a reduced image of the gauge at a point near the focal point of the mirror which in turn focuses an enlarged image of such image on the diffusing screen by reflection in the inclined plane mirror.

3. The combination with the features set forth in claim 1, of an optical condensing system associated with the source of light and arranged to concentrate the light from the source on an element of the optical projecting system in the tubular casing.

4. The combination with the features set forth in claim 2, of an optical condensing system associated with the source of light and arranged to concentrate the light from the source on the projecting lens in the tubular casing.

5. The combination with the features set forth in claim 1, of means for adjusting the diffusing screen and the inclined mirror in the tubular casing to suit the direction from which the indications on the diffusing screen are to be viewed.

6. The combination with the features set forth in claim 1, of means for adjusting the optical projecting system to permit the rays of light to approach the tubular casing at an angle to the axis thereof.

7. The combination with the features set forth in claim 2, of means for adjusting the projecting lens, the curved mirror and the inclined plane mirror to permit the rays of light to approach the tubular casing at an angle to the axis thereof.

8. In a liquid level indicating arrangement, the combination with a liquid level gauge, of means whereby the indications of the gauge are reproduced at a distance comprising a source of light for illuminating the gauge, a diffusing screen, an optical projecting system by means of which a real image of the gauge is focussed on the diffusing screen, and an optical condensing system associated with the source of light and arranged to concentrate the light from the source on an element of the optical projecting system, the optical condensing system comprising a condensing mirror in the form of a narrow strip cut at one side of the axis from a mirror designed to have low spherical aberration, the source of light being located on the axis of the mirror close to the focus thereof.

9. The combination with the features set forth in claim 2, of an optical condensing system associated with the source of light and arranged to concentrate the light from the source on the projecting lens in the tubular casing, the optical condensing system comprising a condensing mirror in the form of a narrow strip cut at one side of the axis from a mirror designed to have low spherical aberration, the source of light being located on the axis of the mirror close to the focus thereof.

10. In a liquid level indicating arrangement, the combination with a liquid level gauge, of means whereby the indications of the gauge are reproduced at a distance comprising a source of light for illuminating the gauge, a diffusing screen, an optical projecting system by means of which a real image of the gauge is focussed on the diffusing screen, and an optical condensing system associated with the source of light and arranged to concentrate the light from the source on an element of the optical projecting system, the optical condensing system comprising a condensing mirror in the form of a narrow strip cut at one side of the axis from a mirror designed to have low spherical aberration, the source of light being located on the axis of the mirror close to the focus thereof, and a concave spherical mirror disposed on the side of the source of light remote from the condensing mirror strip with the source of light lying close to the centre of curvature thereof.

11. The combination with a liquid level gauge, of means for illuminating the gauge comprising a vertically mounted condensing mirror in the form of a narrow strip and at one side of the axis from a mirror designed to have low spherical aberration, and a source of light located on the axis of the mirror and close to the focus thereof.

12. The combination with a liquid level gauge, of means for illuminating the gauge comprising a condensing mirror in the form of a narrow strip cut at one side of the axis from a mirror designed to have low spherical aberration, a small but intense source of light located on the axis of such mirror and close to the focus thereof, and a reflector in the form of a narrow strip cut from a concave spherical mirror disposed on the side of the source of light remote from the condensing mirror and having the source of light located close to its centre of curvature.

13. In a liquid level indicating arrangement, the combination with a liquid level gauge of the transparent prism type so arranged that a visible indication of the liquid level is obtained owing to the difference between the refractive indices of the liquid and the gas or vapour space above it, of means whereby the indications of the gauge are reproduced at a distance comprising a source of light for illuminating the gauge, a diffusing screen, an optical projecting system by means of which a real image of the gauge is focussed on the diffusing screen, and an optical condensing system associated with the source of light and arranged to concentrate the light from the source on an element of the optical projecting system.

14. In a liquid level indicating arrangement, the combination with a liquid level gauge of the transparent prism type so arranged that a visible indication of the liquid level is obtained owing to the difference between the refractive indices of the liquid and the gas or vapour space above it, of means for illuminating the gauge comprising a vertically mounted condensing mirror in the form of a narrow strip cut at one side of the axis from a mirror designed to have low spherical aberration, and a source of light located on the axis of the mirror and close to the focus thereof.

15. In a liquid level indicating arrangement, the combination of a liquid level gauge of the kind having curved gauge surfaces, an astigmatic optical system associated with the gauge and so arranged that a beam of parallel light incident on the combined gauge and astigmatic system would emerge therefrom as a beam of parallel light, and means whereby the indications of the gauge are reproduced at a distance comprising a source of light for illuminating the gauge, a diffusing screen, an optical projecting system by means of which a real image of the gauge is focussed on the diffusing screen, and an optical condensing system associated with the source of light and arranged to concentrate the light from the source on an element of the optical projecting system.

16. In a liquid level indicating arrangement, the combination of a liquid level gauge of the kind having curved gauge surfaces, an astigmatic optical system associated with the gauge and so arranged that a beam of parallel light incident on the combined gauge and astigmatic system would emerge therefrom as a beam of parallel light, and means for illuminating the gauge comprising a vertically mounted condensing mirror in the form of a narrow strip cut at one side of the axis from a mirror designed to have low spherical aberration, and a source of light located on the axis of the mirror and close to the focus thereof.

In testimony whereof I have signed my name to this specification.

CHARLES LORD BLACKBURN.